(12) United States Patent
Valentine et al.

(10) Patent No.: US 7,366,157 B1
(45) Date of Patent: Apr. 29, 2008

(54) METHODS AND SYSTEM FOR ROUTING EMERGENCY CALLS THROUGH THE INTERNET

(75) Inventors: Eric Valentine, Plano, TX (US); Lee Davidson, McKinney, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/195,333

(22) Filed: Nov. 17, 1998

(51) Int. Cl.
*H04L 12/66* (2006.01)
*H04M 11/04* (2006.01)

(52) U.S. Cl. ............... 370/352; 370/466; 370/389; 370/401; 379/37; 379/45

(58) Field of Classification Search ............ 370/464, 370/465, 466, 467, 901, 352–356, 401, 389; 379/40, 49, 220.01, 221.01, 88.17, 90.01, 379/93.01, 93.05, 100.15, 230, 900, 221.06, 379/221.08, 221.09, 37, 45; 707/10, 201; 709/200, 201, 219, 217
See application file for complete search history.

(56) References Cited

U.S. PATENT DOCUMENTS

| | | | | | |
|---|---|---|---|---|---|
| 5,161,180 | A | * | 11/1992 | Chavous | 379/45 |
| 5,339,351 | A | * | 8/1994 | Hoskinson et al. | 379/45 |
| 5,347,567 | A | * | 9/1994 | Moody et al. | 379/45 |
| 5,596,625 | A | * | 1/1997 | LeBlanc | 455/404.2 |
| 6,047,327 | A | * | 4/2000 | Tso et al. | 709/232 |
| 6,151,631 | A | * | 11/2000 | Ansell et al. | 709/229 |
| 6,271,752 | B1 | * | 8/2001 | Vaios | 340/541 |
| 6,356,751 | B1 | * | 3/2002 | Valentine et al. | 455/404.1 |
| 6,463,051 | B1 | * | 10/2002 | Ford | 370/352 |
| 6,529,501 | B1 | * | 3/2003 | Zhao et al. | 370/353 |
| 6,614,780 | B2 | * | 9/2003 | Hakim et al. | 370/352 |
| 6,678,357 | B2 | * | 1/2004 | Stumer et al. | 379/45 |
| 6,807,564 | B1 | * | 10/2004 | Zellner et al. | 709/206 |
| 2001/0055299 | A1 | * | 12/2001 | Kelly | 370/352 |
| 2002/0150086 | A1 | * | 10/2002 | Bailey et al. | 370/352 |
| 2003/0063714 | A1 | * | 4/2003 | Stumer et al. | 379/37 |
| 2004/0057425 | A1 | * | 3/2004 | Brouwer et al. | 370/352 |
| 2005/0006109 | A1 | * | 1/2005 | McSheffrey et al. | 169/75 |

* cited by examiner

*Primary Examiner*—Wing Chan
*Assistant Examiner*—Robert C Scheibel

(57) ABSTRACT

A system (100) and method for routing an emergency request message from an Internet user (50) to an emergency-call-answering center (31) consisting of Public Service Access Points (PSAPs). An emergency request message is transmitted to an IP network (60) which is received by an emergency call handling function (172). The emergency call handling function (172) queries a database (170) and returns the physical location information associated with the IP address of the user (50). The call is formatted into a format compatible with the emergency call answering center (31) and transmitted via the PSTN (20) to the PSAP (36) serving the correct emergency service zone for the user (50).

19 Claims, 3 Drawing Sheets

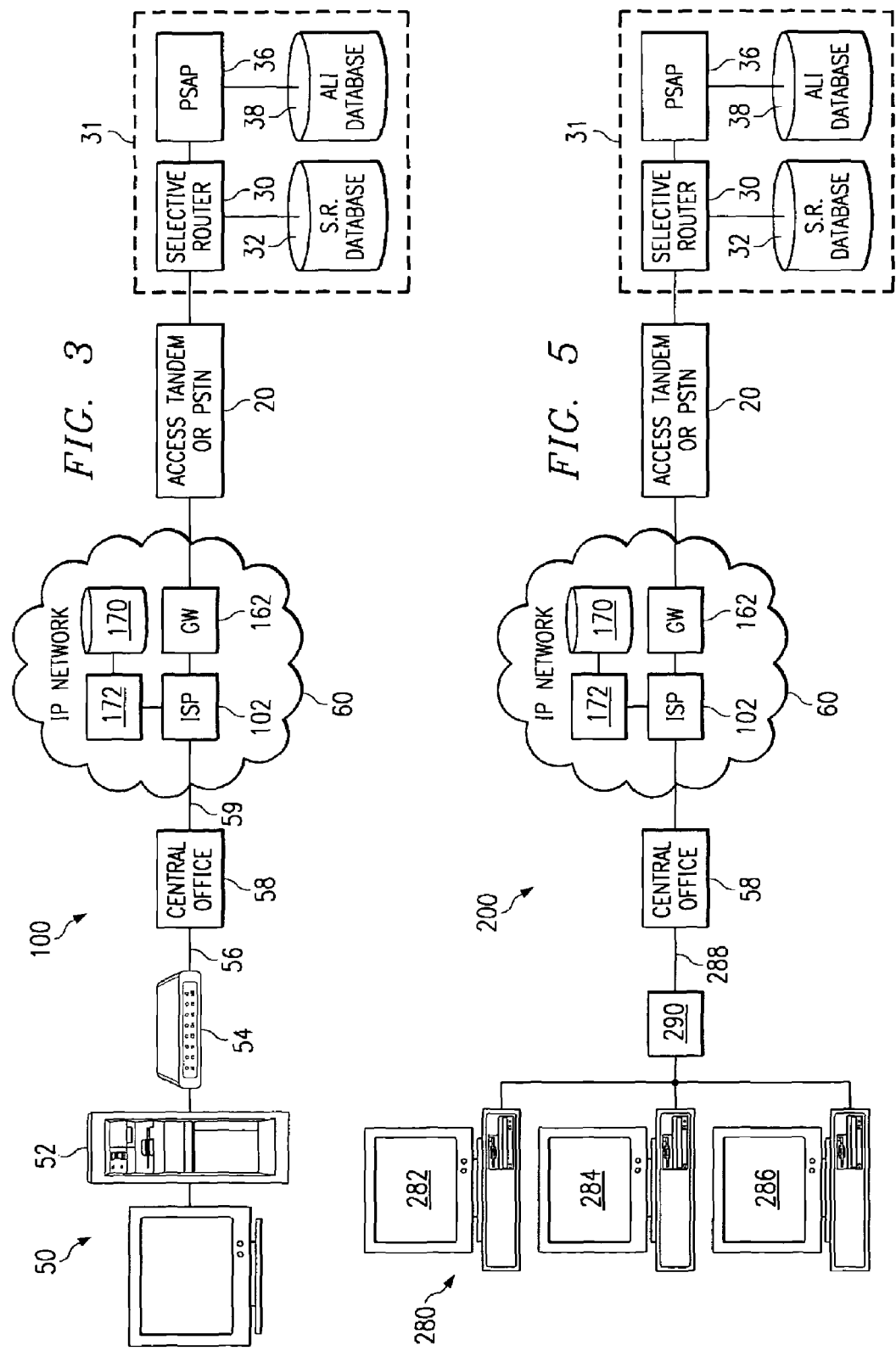

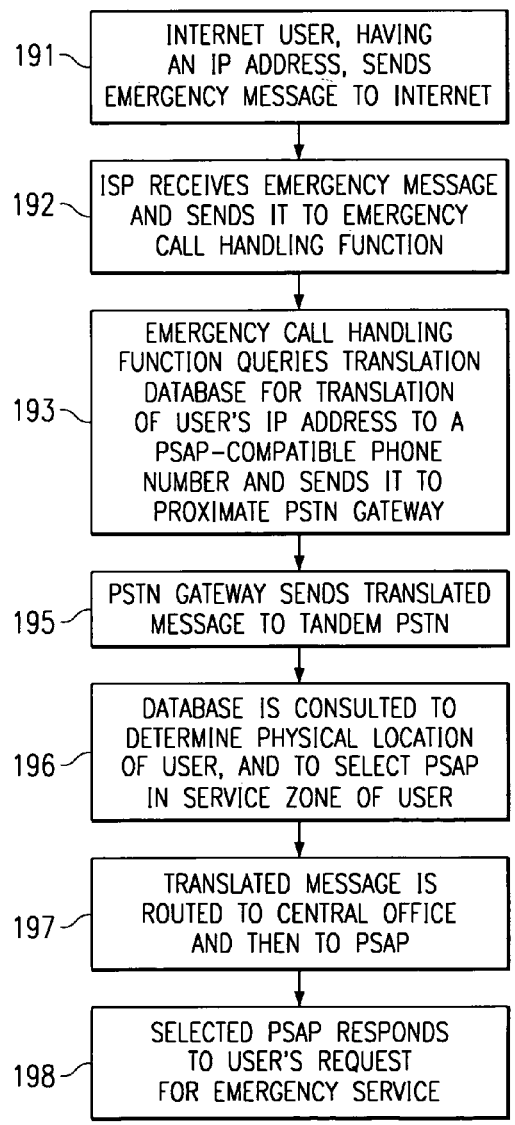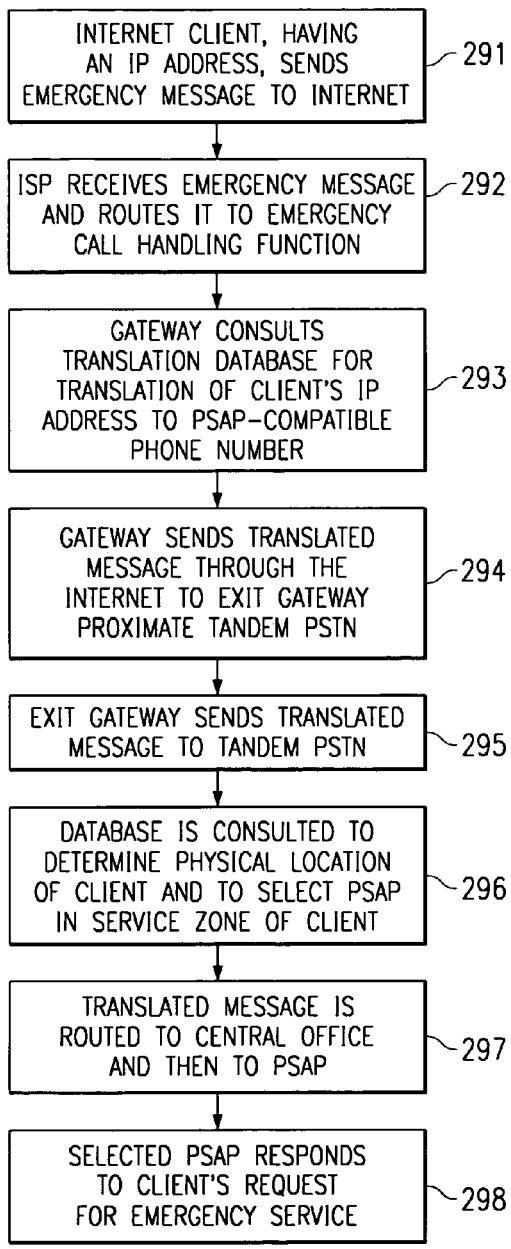

METHODS AND SYSTEM FOR ROUTING EMERGENCY CALLS THROUGH THE INTERNET

TECHNICAL FIELD

This invention relates generally to data communications over the Internet, and more particularly to a method and system of routing an emergency related message request from a user of an Internet device to a telephonic based emergency call answering center.

BACKGROUND OF THE INVENTION

The Internet has become a popular tool for sending and receiving information. In essence, the Internet comprises a worldwide network of communications equipment and service providers, which use a common protocol for communicating. On the Internet, messages are transmitted from one user to another over a vast infrastructure of routers, servers, gateways and other similar devices. Typically, users on either end of the network operate computers equipped with appropriate software, devices and other components. Examples of such components include a modem and Internet browser application. Often, a user establishes a connection to the Internet through an Internet Service Provider (ISP). The underlying link level protocol stacks handle the messaging functions on both ends of the channel.

With most Internet Protocol (IP) applications, the network routes messages from one user to another using the IP address of the intended recipient. Thus, the physical address, phone number and other geographic location indicators are not critical to the message routing functions in an IP network. On the other hand, other communications mediums, such as the Public Switched Telephone Network (PSTN), support connections by tying a user with his or her phone number. An example are the Public Service Access Points (PSAPs) which support a network of emergency call answering centers throughout the United States. With such centers, the user is able to get emergency assistance by dialing a special number such as 9-1-1. The PSTN routes the call to the appropriate center serving the emergency zone of the caller based on their phone number. The center, in turn, dispatches the appropriate emergency personnel to the caller's location.

At the same time, the widespread use of the Internet as a communications tool has led to an intense push for the integration of Internet services with those offered through the existing telecom infrastructure of the PSTN.

SUMMARY OF THE INVENTION

A problem associated with Internet use is that, in case of an emergency, such as a medical emergency, fire, or intrusion by a criminal, the Internet user may not place an emergency call to a PSAP through the Internet. The current PSAP infrastructure utilizes Centralized Automated Message Accounting (CAMA) protocols containing the calling party's number information in a specified format. With CAMA protocols, information regarding the caller's address can be independently determined using an Automatic Location Identification (ALI) database, thus enabling the PSAP to choose the correct emergency response agency. The present invention solves the disadvantages associated with the prior art by providing a method and system for routing emergency calls from a user of an Internet device through the Internet to a PSTN connected PSAP.

According to one embodiment, disclosed is a method of routing an emergency request message from a user of an Internet device to an emergency call answering center. The method includes the steps of transmitting an emergency request message to a network supporting Internet Protocol (IP), and routing the message to an emergency call handling function. The emergency call handling function is configured to examine the message's IP address and return physical location information of the device which transmitted the emergency request message. The emergency request message is then formatted and routed to the emergency call answering center over the Public Switched Telephone Network (PSTN).

The emergency call handling function can return the telephone number associated with the serving PSAP for the calling user. Thus, the method may also include the step of routing the emergency request message through the PSTN to the emergency response service zone serving the Internet user. Once received, the PSAP can dispatch emergency personnel to assist a user at his or her location.

In one embodiment, the Internet device may be a client terminal in a multiple user environment such as a Local Area Network (LAN). If so, either the client's IP address is dynamically assigned upon login to the IP network, or the client's IP address may be dedicated and used each time access to the Internet is established. In either case, the method includes the step of determining the physical location of the user based on the IP address assigned to the client so that an the emergency request message may then be routed to a PSAP in the proper format. The emergency call handling function may perform a query to a database containing the physical location information of the Internet user.

According to another embodiment, disclosed is a method of converting Internet Protocol emergency messages to protocols compatible with PSTN connected PSAPs. The method includes the steps of detecting an emergency message transmitted by an Internet device to reveal the IP address associated with the message. Next, the IP address is used to query a database containing geographic location information for Internet users. Corresponding physical location information associated with the IP address of the Internet device is returned. The message is then formatted into a number format corresponding to the PSTN subscriber line serving the correct emergency response server zone. The formatted messages can then be routed to serving-PSAP through the PSTN using well known means.

According to another embodiment, disclosed is a communication system for delivering emergency messages placed through the Internet to an emergency call answering center, where the system comprises a central office, an IP network, and a signal pathway between the central office and the IP network. At least one entry gateway is communicably accessible in the IP network and configured to receive Internet emergency messages from IP users. An emergency call handling function is linked to the entry gateway and configured to convert messages into a format compatible with existing PSAP protocols. A database stores a plurality of Internet user records including the physical location of a user associated with their IP address. The physical location information may include the number of the PSAP associated with the central office within the service zone of the caller. The Internet device may be a client terminal in a multi-user environment such as a LAN, wherein the client's IP address is dynamically assigned, by an Internet Service Provider (ISP). The communication system may include a gateway, to the PSTN by which emergency calls are transmitted to the emergency call answering center.

An advantage of the present invention is that Internet users now have access to emergency services over the Internet, without having to use the telephone to place such emergency phone calls.

Another advantage of the present invention includes providing a physical location of a Internet user based on the IP address of a message received from the user.

BRIEF DESCRIPTION OF THE DRAWINGS

The above features of the present invention will be more clearly understood from consideration of the following detailed description taken in conjunction with the drawings in which:

FIG. 3 illustrates a communication system for routing emergency calls through the Internet according to one embodiment;

FIG. 4 is a flow chart illustrating a method for routing emergency calls through the Internet according to one embodiment;

FIG. 5 illustrates an alternate embodiment of the present invention wherein clients in a Local Area Network are able to route calls to emergency call centers; and FIG. 6 is a flow chart illustrating the method for routing emergency call by users in a LAN according to the embodiment shown in FIG. 5.

Corresponding numerals and symbols in the different figures refer to corresponding parts unless otherwise indicated.

DETAILED DESCRIPTION OF PREFERRED EMBODIMENTS

Figure 1:
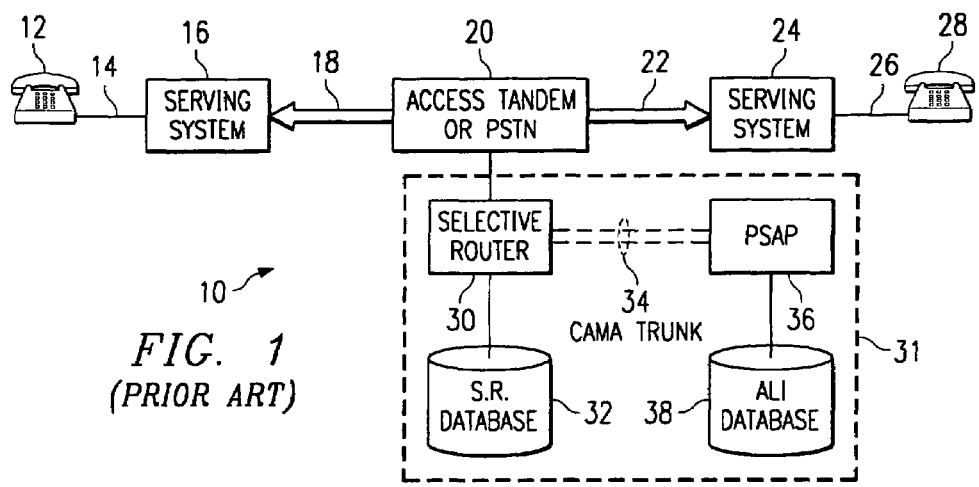
FIG. 1 illustrates the prior art emergency-call-answering center 31 comprising several Public Service Access Points (PSAPs)

FIG. 1 illustrates a traditional telephone system 10 how a user of a Plain Old Telephone System (POTS) can access an emergency call answering center 31 through access tandem or Public Switched Telephone Network (PSTN) 20. The POTS 12 is coupled to phone lines 14 which are often analog twisted pair of the type employed in many PSTN applications. A serving system 16 received calls from the POTS 12 through lines 14. The serving system 16 may be the central office for wireline subscribers, a Mobile Switching Center (MSC) for wireless subscribers, or other similar call exchange facility serving the location where the POTS 12 is located. In essence, the serving system 16 receives calls from the POTS 12 and routes them to emergency call answering center 31 using well known switching and routing means.

As shown, a second POTS 28 may be used from a second location for placing calls to the emergency call answering center 31. Although the physical location of the POTS 12 and POTS 28 differ, the emergency call answering center 31 is still able to dispatch emergency services to the correct location based on the location information associated with the phone number of the calling party. Thus, calls placed from the POTS 28 are received at the serving system 24 through phone lines 26. As before, the PSTN 20 routes the emergency calls (e.g. 9-1-1) to the emergency call answering center 31.

The emergency call answering center 31 receives call from the PSTN 20 and routes it to a selective router 30. As shown, a Public Service Access Point (PSAP) 36 is coupled to the selective router 30 using a Centralized Automated Message Accounting (CAMA) protocol over the trunk 34. Typically, a PSAP 36 is provided for every service zone in the system 10.

The CAMA protocol typically includes the calling party digit information associated with the calling party. Typically, the CAMA trunk 34 can only convey 8 digits of information. An Automatic Location Identification (ALI) database 38 contains the necessary location information for a caller based on the calling party digit information.

The Selective Routing Database 32 converts a telephone number into an Emergency Service Number (ESN) representing an emergency service zone associated with the calling party. Each emergency service zone is served by a primary and alternate PSAP (not shown in FIG. 1). Typically, the emergency zone has a predetermined set of emergency response agencies, one for each type of emergency response required (e.g. fire, police, medical, poison control, etc.).

For a wireline 9-1-1 call, a query to the ALI database 38 is made using the A (calling party) Number Identification (ANI) as the key. The query provides location information such as the street address of the calling party and subscriber information such as the name.

Figure 2:
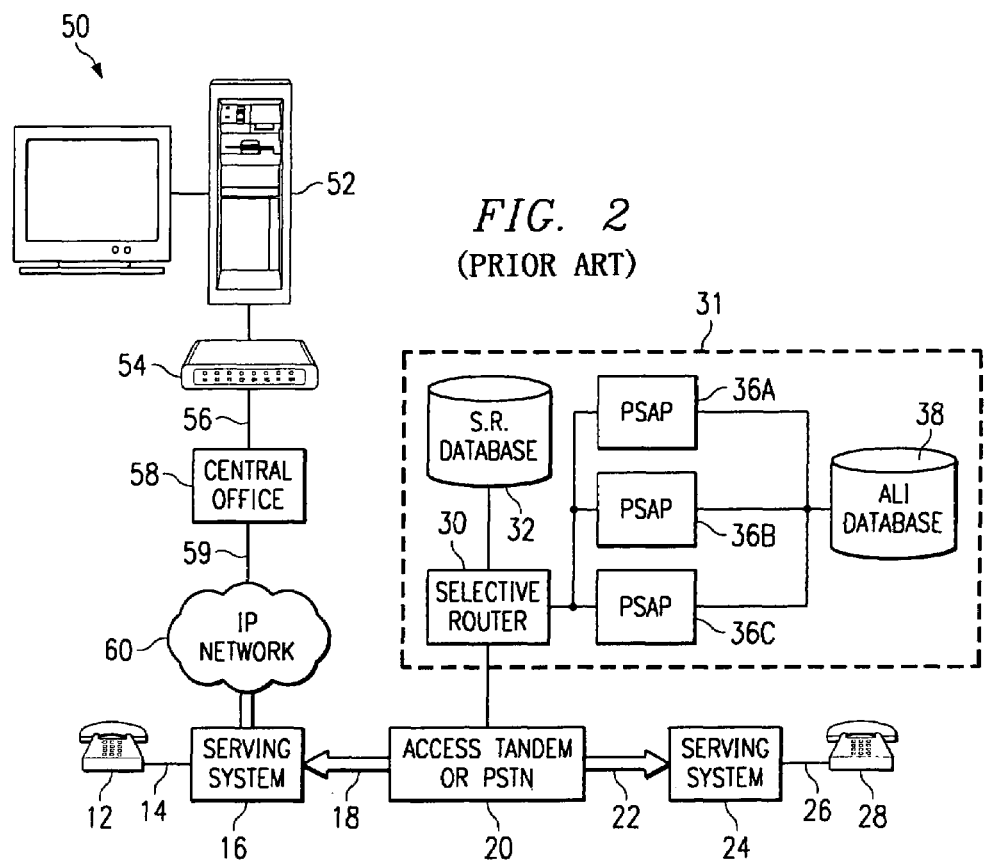
FIG. 2 illustrates the manner in which an Internet device 50 connects to an IP network 60 via the Public Switched Telephone Network (PSTN) 20.

Turning now to FIG. 2, the telephone system 10 of FIG. 1 is expanded to include an Internet device 50 which is utilized by an Internet use to access the Internet Protocol (IP) network 60. As shown, the Internet device 50 employs a computer system 52 with monitor, processor, software applications and other communications facilities necessary to cause the modem 54 to access lines 56 leading to central office 58. The lines 56 are typically analog twisted pair used in traditional telephone applications. In other configurations, a dedicated digital line, such as and E1/T1 connection or ISDN, may be used. The central office 58 is coupled to the IP network 60 through link 59. The IP network 60 includes the various services and resources associated with the Internet which are made available to the Internet device 50.

The problem is that there is no readily available means for the Internet device 50 to access the emergency call control center 31 and provide the location information associated with the Internet device 50. Likewise, the Internet device 50 is unable to call or send messages to POTS 12 or 28 through the PSTN 20. Thus, a means for routing emergency requests from the Internet to 9-1-1 or other public emergency service systems is needed.

Turning now to FIG. 3, the system for routing IP formatted messages to the emergency call center 31 is shown and denoted generally as 100. The communication system 100 has an Internet device 50 with computer 52 utilizing modem 54 or other suitable Internet device to access central office 58 over connection 56. The connection 56 is often twisted pair wiring. In other embodiment, a dedicated digital connection such as an E1/T1, ISDN or other connection type may be employed. The central office 58 is coupled to an IP network 60 which provides the various features and services of Internet.

The central office 58 routes calls placed by the Internet device 50 to an Internet Service Provider (ISP) 102 within the IP network 60 that acts as the entry gateway to the IP network 60 for Internet users. The ISP 102 is the a point of access or node for the Internet device 50 to the IP network 60. Typically the Internet device 50 is assigned an address, which is associated with the user for the duration of an Internet session. The address is utilized by the Internet device 50 to perform basic Internet functions such as sending and receiving e-mail messages through the IP network 60. The IP address assigned is typically of the numeric format aa.bb.cc.dd. for example. With most common IP addressing schemes, an IP address is not associated with the physical location of the user 50; rather, the IP address provides a handle by which the user 50 can be identified within the IP network 60.

Many users can obtain an account with the ISP 102 which provides on-demand access to the IP network 60. Typically, an ISP 102 obtains the users' accounting information, such as address, phone number and other user information that is associated with the user's account. According to one embodiment of the invention, such user information can be relayed to an emergency call handling function 172 implemented to handle emergency message requests through the IP network 60. Specifically, the emergency call handling function 172 provides a translation of the user's IP address to their physical location information.

The translation function 172 can employ a database 170 containing geographic location information for users of the IP network 60. Thus, the database 170 is accessed by the emergency call handling function 172 once a call for emergency services is placed by the Internet device 50 through the IP network 60.

According to one embodiment, the IP network 60 includes an exit gateway 162 to the PSTN 20 that permits transmission of Internet messages to the PSTN 20 using protocols and signaling means compatible with current telephone numbering standards. In order to format the Internet messages so that they may be properly routed and utilized by the PSTN 20, the IP network 60 utilizes the database 170 in communication with the emergency call handling function 172. Thus, the fact that database 170 is contained in IP network 60 permits the routing of emergency calls from the Internet device 50 to an emergency call answering center 31. In one embodiment, the emergency call handling function 172 is a separate element outside the IP network 60 and maintained by a third party administrator.

Thus, when an Internet device 50 sends an emergency request message through the IP network 60, it reaches the emergency call handling function 172 which, in turn, queries the database 170 for the physical location indicator associated with the IP address associated with the Internet user as revealed in the emergency request message. The database 170 returns the corresponding physical location information to the emergency call handling function 172. In one embodiment, the physical location information is encapsulated within a PSAP formatted message containing the corresponding telephone number for the PSAP assigned to the requesting user's physical location. The PSAP formatted message can then be routed to PSTN gateway 162 and on into the PSTN 20. The PSTN 20 routes the call as it would any other emergency call (e.g. 9-1-1) to the emergency call answering center 31 via the gateway 162.

FIG. 4 is a process flow diagram illustrating a method of routing an emergency call from an Internet user to an emergency call answering center 31 according to one embodiment of the invention. Assuming Internet device 50 is in need of emergency service such as police, fire, medical or other similar emergency assistance, Internet device 50 transmits an emergency request message through the IP network 60 at step 191. Next, at step 192, the message is routed to the emergency call handling function 172. At step 193 the emergency call handling function 172 queries the database 170 which returns the physical location information associated with the user's IP address as well as a PSAP-compatible phone number associated with the user's IP address.

The caller's location information is delivered to the access tandem or PSTN 20 via gateway 162. Next, in step 195, the exit gateway 162 sends a PSAP formatted message to the PSTN 20. The PSTN 20 receives the message, step 196, and routes it to the emergency call answer center 31. The selective router 30 within the emergency call answering center 31 utilizes the caller's location information and routed the call to the appropriate PSAP within the service zone of the user 50, step 197. Finally, the selected PSAP 138 responds to the user's request for emergency service by sending emergency personnel to assist the user 150, step 198.

As mentioned, an ISP (not shown) can provide the physical location information associated with a requesting user's IP address. The information can be stored in a database 170, for example, accessible by the emergency call handling function 172. It should be understood that other methods of obtaining the physical location information of the Internet device 50 are contemplated.

One aspect of the invention is that it may be implemented in various user configurations. For example, in FIG. 5 a configuration with multiple Internet users, or clients, connected in a Local Area Net (LAN) 280 is shown and denoted generally as 200. As shown, client terminals 282, 284 and 286 have access to the central office 58 through hub 290 which can be a router, switch or other similar call exchange mechanism. Often the connection 288 between the hub 290 and the central office 58 is a high speed digital link.

The configuration 200 allows clients 282, 284 and 286 on the LAN 280 to access the IP network 60 through a central node. The hub 290 acts as a gateway to the central office 58 through connection 288, which may be a dedicated digital connection such as an E1/T1 or ISDN line, for example, to a central office 58. Other connection methods may be employed.

The central office 58 directs traffic to Internet Server Provider (ISP) 102 which provides each client terminal 282, 284 and 286 access to the IP network 60. Typically, an IP address is dynamically assigned to a client terminal 282, 284, 286 during a log-in sequence to the ISP 102. The ISP 102 verifies the client's account information and assigns an IP address that is associated with the client terminal for the duration of the session. In this way, a client terminal obtains access to the IP network 60. In other configurations, IP addresses are dedicated to a specific client (e.g., static) so that the same IP address is used every time.

The invention contemplates use in a networked environment where a client terminal is assigned a different IP address each time the client is granted access to the IP network 60. Thus, according to one embodiment of the invention, the emergency call handling function 172 is configured to return physical location information about a client regardless of the specific IP address assigned to that client terminal for an IP session.

The configuration of clients 282, 284, 286 is typical of many networked environments where multiple users are connected to the Internet through a common hub or centralized access point. For example, clients 282, 284 and 286 may work at the same company, yet reside on different floors of a building, or different buildings within a complex. Users on a LAN 280 particularly benefit from the present invention because database 170 can be utilized to track the physical location of a user to the assigned IP address for each particular Internet session.

Turning now to FIG. 6, a process flow diagram for the method of routing emergency calls from a client in a networked environment such as configuration 200 of FIG. 5 is shown. Assuming a client terminal is in need of emergency services, the user of the client terminal logs on to the ISP 102 and transmits a emergency message to the IP Network 60 at step 291. The emergency call handling function 172 receives the emergency message, step 292, and queries the database 170 for the physical location information associated with the client terminal. The information may be provided by the ISP 102 utilizing the client's account information. The database 170 returns the information indicating the physical location of the client terminal.

At step 293, the gateway 162 formats a message using a protocol compatible with the emergency call answering center 31. For example, the message can be translated to the appropriate telephone number format, step 293. The formatted message is directed to the PSTN 20 by the gateway 162 at step 294. The PSTN 20 selects the route path corresponding to the PSAP associated with the location information of the client terminal, steps 296 and 297. The appropriate PSAP responds to the clients request for emergency-service by dispatching the appropriate emergency personnel, step 298.

The database 170 can include a look-up table indicating which users are connected to the IP network, their assigned IP address, and their physical location. The novel method and system of routing an emergency request message from an Internet client to an emergency-call-answering center permits the routing IP formatted emergency messages to traditional emergency-call-answering centers, such as those accesses by dialing 9-1-1 using a Plain Old Telephone System (POTS).

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, although it is preferable to have the translation 270 database in the Internet, it may be placed elsewhere in the system, for example, external to the Internet, or within the Intranet of a LAN. It is therefore intended that the appended claims encompass any such modifications or embodiments.

What is claimed is:

1. A method of routing an emergency request message from an Internet device through the Internet to an emergency call answering center connected to a Public Service Access Point (PSAP), comprising the steps of:
routing the emergency request message to an emergency call handling function that is configured to determine the IP address of the Internet device,
the emergency call handling function querying an Internet Service Provider (ISP) associated with the Internet device, the ISP having account information associated with the IP address of the Internet device;
utilizing the IP address of the Internet device to obtain a physical address from the account information; and
the emergency call handling function:
encapsulating the physical address information within a PSAP message; and
sending the emergency request message along with the physical address through Public Switched Telephone Network (PSTN) to a PSAP in an emergency response service zone serving the Internet device.

2. The method of claim 1 wherein the step of encapsulating the physical address associated with the IP address in a PSAP message, further comprises the PSAP message including a telephone number for the PSAP assigned to the service zone covering the physical address.

3. The method of claim 2, further comprising routing the PSAP message via a PSTN gateway into the PSTN and on to an appropriate central office or a selected PSAP.

4. The method of claim 3, wherein the PSAP message is routed to the central office and the PSAP closest to the physical address associated with the Internet device.

5. The method of claim 1, wherein the Internet device has a static IP address.

6. The method of claim 1 wherein an IP address is dynamically assigned to the Internet device when logging on to the ISP.

7. The method of claim 6 wherein the Internet device is a terminal in a local area network (LAN).

8. The method of claim 1, wherein the required registration information associated with the IP address, including the physical address, is contained in a database that includes account information required by the ISP to provide the Internet device access to the Internet, the information being associated with a user or subscriber and the Internet device.

9. The method of claim 1 wherein the emergency call handling function is included within the PSTN gateway and the gateway, using a protocol compatible with the emergency call answering center,
formats a message containing the physical address associated with the Internet device.

10. A system for routing an emergency request message from an Internet device through an Internet Protocol (IP) network to an emergency call answering center connected to a Public Service Access Point (PSAP), comprising:
routing means for routing the emergency request message to an emergency call handling function that is configured to determine an IP address of the Internet device;
the emergency call handling function for utilizing the IP address of the Internet device to obtain a physical address from an Internet Service Provider (ISP) associated with the Internet device, the ISP having account information including the physical address associated with the IP address of the Internet device; and
the emergency call handling function having:
encapsulation means for encapsulating the physical address information within a PSAP message; and
means for sending the emergency request message along with the physical address information through a Public Switched Telephone Network (PSTN) to a PSAP in an emergency response service zone serving the Internet device.

11. The system of claim 10 wherein means for encapsulating the physical address associated with the IP address in a PSAP message, further comprises the PSAP message including a telephone number for the PSAP assigned to a service zone covering the physical address.

12. The system of claim 11, further comprising
means for routing the PSAP message via a PSTN gateway into the PSTN and on to an appropriate central office or a selected PSAP.

13. The system of claim 12, wherein the PSAP message is routed to the central office and the PSAP closest to the physical address associated with the Internet device.

14. The system of claim 10, wherein the Internet device has a static IP address.

15. The system of claim 10 wherein an IP address is dynamically assigned to the Internet device when logging on to the ISP.

16. The system of claim 15 wherein the Internet device is a terminal in a local area network (LAN).

17. The system of claim 10, wherein the required registration information associated with the IP address is contained in a database that includes account information required by the ISP to provide the Internet device access to the Internet, the information being associated with a user or subscriber and the Internet device.

18. The system of claim 12 wherein the emergency call handling function is included within the PSTN gateway and the PSTN gateway, using a protocol compatible with the emergency call answering center, is adapted for formatting a message containing the physical address associated with the Internet device.

19. The system according to claim 10 wherein said emergency call handling function is a separate element outside the IP network maintained by a third party administrator.

* * * * *